United States Patent Office 3,049,550
Patented Aug. 14, 1962

3,049,550
PROCESS FOR THE PRODUCTION OF 3-AMINO-4,7-DIHYDROXYCOUMARIN HYDROCHLORIDE
Claude Spencer, Chatham, and Edward Walton, Scotch Plains, N.J., assignors to Merck & Co., Inc., Rahway, N.J., a corporation of New Jersey
No Drawing. Original application Apr. 19, 1956, Ser. No. 579,401. Divided and this application Jan. 13, 1960, Ser. No. 7,504
2 Claims. (Cl. 260—343.2)

This invention relates to antibiotic substances and methods of synthesizing the same. More particularly, it is concerned with the synthesis of desmethylnovobiocin and related antibiotic substances.

This application is a division of the copending application Serial No. 579,401, filed April 19, 1956, now abandoned.

Novobiocin (the generic name for an antibiotic the proprietary name for one brand of which is "Cathomycin"), is produced by growing, under controlled conditions, a previously unknown species of microorganism which has been named Streptomyces spheroides. This microorganism, which was isolated from a sample of soil from an old sod pasture in Vermont, has been designated Streptomyces spheroides MA–319 in the culture collection of Merck & Co., Inc., Rahway, New Jersey. A viable culture thereof has been deposited with the Fermentation section of the Northern Utilization Research Bureau, United States Department of Agriculture at Peoria, Illinois, and added to its permanent culture collection as NRRL 2449.

Aqueous media that are suitable for aerobic cultivation of strains of Streptomyces spheroides to produce novobiocin are, generally stated, those suitable for the production of other antibiotics by cultivation of other Streptomyces organisms. Such media contain sources of assimilable carbon, such as carbohydrate; of assimilable nitrogen, such as corn steep liquor, casein hydrolysate, distiller's solubles, or the like; and inorganic salts, including trace metals, required for proper metabolism of the microorganism. Preferably, the medium is maintained at a temperature of 24°–28° C. during the period, usually about one to seven days, in which the microorganism is cultivated, and aeration is provided for optimum growth of the organism and production of novobiocin. Fermented broths produced in this manner have an activity of about 150–2000 novobiocin units per milliliter, and the fermentation broth solids have an activity of the order of about 2.25 novobiocin units per milligram of solids. The antibioactive material can be purified and recovered in purer form by any of several procedures.

For example, the whole broth may be filtered at the hydrogen-ion concentration of harvest, usually about pH 7.0–7.0; the filtrate may be extracted at a hydrogen-ion concentration within the acid range below about pH 7.0 with a substantially neutral, merely slightly polar, water immiscible, liquid organic solvent soluble in cold concentrated sulfuric acid and in cold syrupy orthophosphoric acid; and the organic extract may be extracted with an aqueous alkaline buffer solution at a hydrogen-ion concentration of at least pH 8.5 to obtain a solution containing a substantial concentration of novobiocin salt. The two extraction steps may be repeated in succession, to obtain an even more concentrated solution from which novobiocin-active material may be recovered by acid precipitation. The product thus obtained may be purified by recrystallization from an aqueous acidic alcohol solution.

This new antibiotic, novobiocin, is comprised of the elements carbon, hydrogen, nitrogen, and oxygen, combined in a substance having approximately the formula $$C_{31}H_{36}N_2O_{11}$$

according to present data. It reacts as an acidic organic compound toward and is easily soluble in alkaline reagents, such as aqueous solutions of alkali-metal hydroxides, carbonates, and bicarbonates; it has two base-binding groups and can be precipitated from its solution in alkalies by acidification. It is soluble in the lower alkanols, lower aliphatic ketones, acetic acid, ethyl acetate, dioxane; and it is insoluble or merely sparingly soluble in ether, benzene, chloroform, carbon tetrachloride, ethylene dichloride, water, and hydrochloric acid.

Substantially pure novobiocin has been obtained in two crystalline modifications: a form crystallizing as rosettes and melting at about 152°–154° C., and another form having the appearance of flat needles, melting at about 170°–172° C. Each of these crystalline forms of the antibiotic can be converted into a so-called normalized form, which may be an amorphous or submicrocrystalline form, by dissolving the crystals in acetone, quickly adding to this solution a relatively large volume of petroleum ether, and recovering the precipitated normalized material by filtration.

Alkaline aqueous solutions of novobiocin and mineral oil suspensions of the normalized form of the antibiotic exhibit characteristic absorption, the former in the ultraviolet and the latter in the infrared portions of the radiation spectrum. A solution of substantially pure novobiocin in 0.1 N aqueous sodium hydroxide exhibits a characteristic ultraviolet absorption peak at 3070 A. This absorption peak is indicative of a substantially pure material having a specific absorbency of 600, measured at this wavelength, using a solution containing one gram of pure novobiocin per hundred milliliters of the solution, contained in a cell having an absorption path of one centimeter. A solution of pure novobiocin in 0.1 N aqueous-methanolic hydrochloric acid exhibits a characteristic ultraviolet absorption peak at 3240 A. with

 390

A mineral oil suspension of substantially pure normalized novobiocin exhibits characteristic infrared absorption peaks at the following wavelengths, expressed in microns: 5.8–6.0 (broad), 6.10, 6.21, 6.30, 6.49, 6.63, 7.4–7.6 (broad shoulder), 7.78, 7.96, 8.27 (weak), 8.60 (shoulder), 8.7 (shoulder), 9.13, 9.40, 10.0–10.1 (broad), 10.28, 10.60 (broad), 12.0–12.30 (broad), 12.60–12.75 (broad), 13.07, and 13.39.

Novobiocin units are related to the microbiological activity of substantially pure crystalline novobiocin; the microbiological activity of substantially pure crystalline novobiocin has been arbitrarily taken as 5,000 units per milligram, as determined by standard cup-plate diffusion methods, using Bacillus subtilis ATTC 12,432 as the test organism.

Novobiocin is optically active, $[\alpha]_D^{25} = -27°$ (C., 1 in 1 N sodium hydroxide) and $[\alpha]_D^{25} = -44°$ (C., 1 in pyridine).

Novobiocin is active in inhibiting growth of gram-positive microorganisms primarily, although it also exhibits some activity against gram-negative microorganism. It inhibits growth of the following organisms, inter alia:

*M. pyogenes* var. *albus*
*M. pyogenes* var. *aureus*
*Diplococcus pneumoniae*
*Corynebacterium diphtheriae* type gravis
*Corynebacterium diphtheriae* type intermedius
*Corynebacterium diphtheriae* type mitis
*Corynebacterium xerose*
*Corynebacterium renale*
*Neisseria meningitidis*
*Sarcina lutea* (VD)
*M. pyogenes* var. *aureus* resistant to aureomycin
*M. pyogenes* var. *aureus* resistant to streptomycin-streptothricin
*M. pyogenes* var. *aureus* resistant to penicillin Novobiocin salts also have antibiotic activity. For example, the sodium salt of novobiocin, when tested by the agar streak dilution assay, was found to inhibit the growth of various strains of *M. pyogenes* var. *aureus*, *M. pyogenes* var. *albus*, *Neisseria meningitidis* (No. 274), and *Sarcina lutea* (VD) at concentrations below 0.5 mcg. per ml. Other microorganisms are also affected by novobiocin to its salts in varying degrees.

It is now discovered, according to the present invention, that 8-desmethyl novobiocin and related substances can be prepared by reacting 2-acyloxy-3-carbamyl-4-methyl-novobiosyl chloride (IX–R) with a 3-acylamido-4,7-dihydroxy-coumarin (V–R) in the presence of silver oxide, and then hydrolyzing the resulting reaction product. This reaction can be shown as follows:

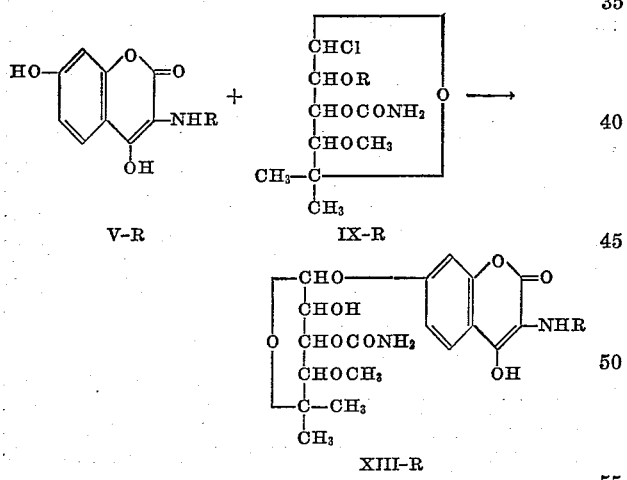

wherein R represents an acyl radical.

Thus, when 3-(3-[γ,γ-dimethylallyl]-4-acyloxybenzamido)-4,7-dihydroxycoumarin (VI–R) is reacted with 2-acyloxy-3-carbamyl-4-methylnovobiosyl chloride in the presence of silver oxide and the condensation product is hydrolyzed, 8-desmethyl-novobiocin (X) is produced. Similarly, when 3-(3-[3-methylbutyl]-4-acyloxybenzamido)-4,7-dihydroxycoumarin (VII–R) is reacted with 2-acyloxy-3-carbamyl-4-methylnovobiosyl chloride and the intermediate acylated derivative is hydrolyzed, 8-desmethyl-dihydronovobiocin (XI) is obtained. In this way other compounds related to desmethylnovobiocin and desmethyldihydronovobiocin and having antibiotic activity can be produced. Thus, when 3-(2,2-dimethylchroman-6-carboxamido)-4,7-dihydroxycoumarin (VIII–R) and 3-acetamido-4,7-dihydroxycoumarin (V) are reacted with 2-acyloxy-3-carbamyl-4-methylnovobiosyl chloride and the resulting condensation products are hydrolyzed, 8-desmethylcyclonovobiocin (XII) and 3-acetamino-7-(3-carbamyl-4-methylnovobiosyloxy)-4-hydroxycoumarin (XIII–C) respectively are produced.

The foregoing described reactions can be shown structurally as follows:

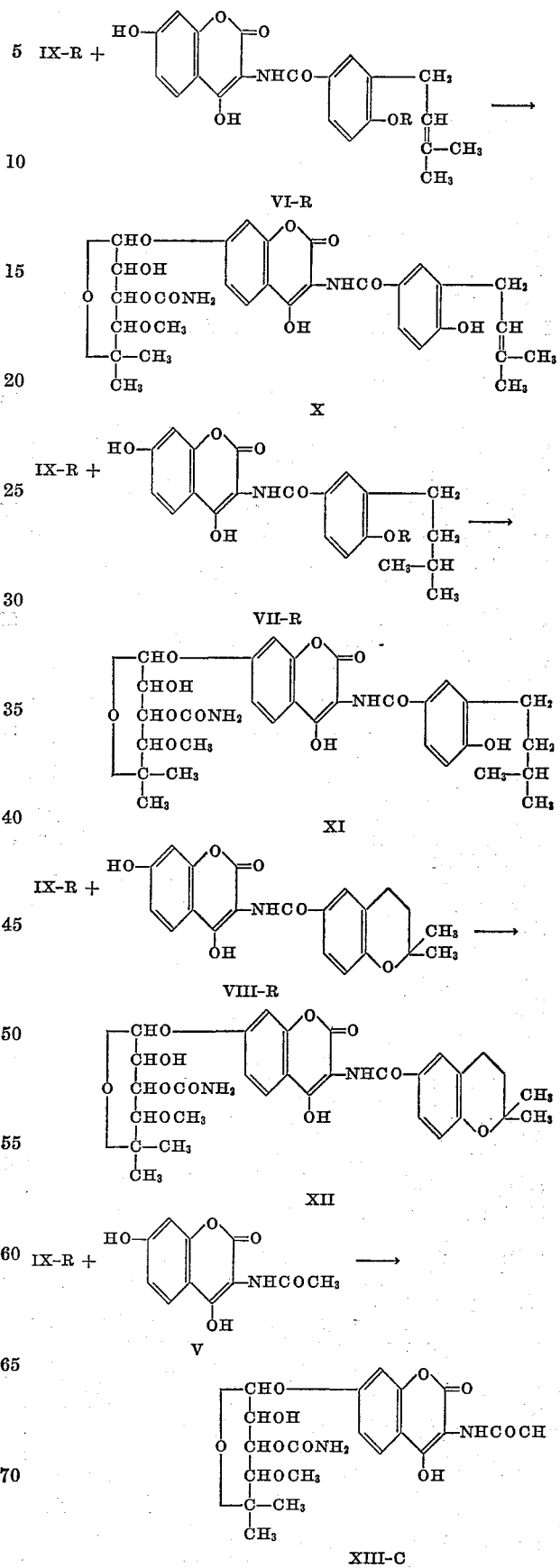

wherein R is an acyl substituent.

In carrying out this process for the preparation of novobiocin and the compounds related thereto pursuant to the present invention, the 3-acylamido-4,7-dihydroxycoumarin is dissolved in a suitable solvent, such as dioxane, and silver oxide is added thereto. To the resulting suspension is then added the 2-acyloxy-3-carbamyl-4-methylnovobiosyl chloride and the reaction mixture is stirred for sufficient time to complete the formation of the condensation product. Usually, it is found that stirring at room temperature for 5–10 hours is sufficient to complete the reaction.

In general, it is found desirable to carry out the reaction in the absence of light and under substantially anhydrous conditions in order to obtain optimum yields of the desired reaction product. Also, it is found that the reaction proceeds more rapidly if a small amount of iodine is added to the reaction mixture, although the addition of iodine is not essential to the condensation reaction.

After completion of the condensation reaction, the acyl substituent of the novobiosyl moiety is readily removed by hydrolysis with alkali. Thus, after filtering the reaction mixture to remove insoluble by-products and following reduction of the excess iodine with sodium bisulfite, the filtrate is concentrated to a small volume at reduced pressure and treated with sodium hydroxide to a pH of about 7 which hydrolyzes off the acyl substituent of the novobiosyl moiety. The 8-desmethyl novobiocin or 8-desmethyl novobiocin-like compound is conveniently recovered from the neutralized solution by lyophilization. The product so obtained can be further purified by recrystallization from suitable solvents or solvent mixtures.

The 2-acyloxy-3-carbamyl-4-methylnovobiosyl chloride (IX–R) used in the condensation reactions described above can be prepared by acylating 3-carbamyl-4-methylnovobiose (X) to form the diacyl derivative, 1,2-diacyloxy-3-carbamyl-4-methylnovobiose (XI–R), and then reacting this diacylated compound with hydrogen chloride under anhydrous conditions to produce 2-acyloxy-3-carbamyl-4-methylnovobiosyl chloride (IX–R). These reactions can be shown structurally as follows:

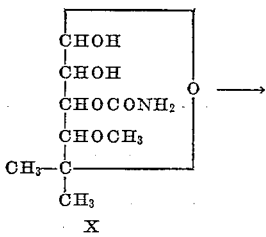

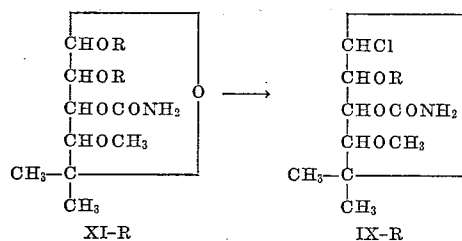

wherein R represents an acyl radical.

The 3-carbamyl-4-methylnovobiose (X) used as the starting material in the above process can be prepared by processes which are more fully described in the copending application of Clifford Shunk, Serial No. 579,142, filed April 19, 1956.

Pursuant to another embodiment of the present invention, it is now found that the 3-acylamido-4,7-dihydroxycoumarin (V–R) used as a starting material in the processes described above can be prepared by acylating 3-amino-4,7-dihydroxycoumarin. This reaction can be shown structurally as follows:

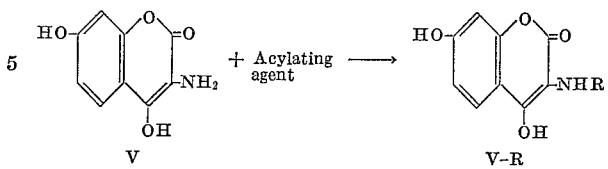

wherein R represents an acyl substituent.

Thus, the 3-amino-4,7-dihydroxycoumarin can be acylated by reaction with an acid anhydride in the presence of pyridine, for example, acetic anhydride in the presence of pyridine, to produce the corresponding acylated derivative. Alternatively, the 3-amino-4,7-dihydroxycoumarin can be acylated by reaction with an acid chloride. For example, when 3-amino-4,7-dihydroxycoumarinhydrochloride (III) is reacted with 3-(γ,γ-dimethylallyl)-4-acyloxybenzoyl chloride, 3-(3-methylbutyl)-4-acyloxybenzoyl chloride or 2,2-dimethylchroman-6-carbonyl chloride in the presence of sodium acetate, 3-(3-[γ,γ - dimethylallyl] - 4 - acyloxybenzamido) - 4,7 - dihydroxycoumarin (VI), 3-(3-[3-methylbutyl]-4-acyloxybenzamido)-4,7-dihydroxycoumarin (VII), and 3-(2,2-dimethylchroman - 6 - carboxamido) - 4,7 - dihydroxycoumarin (VIII) respectively are produced. These reactions can be shown structurally as follows:

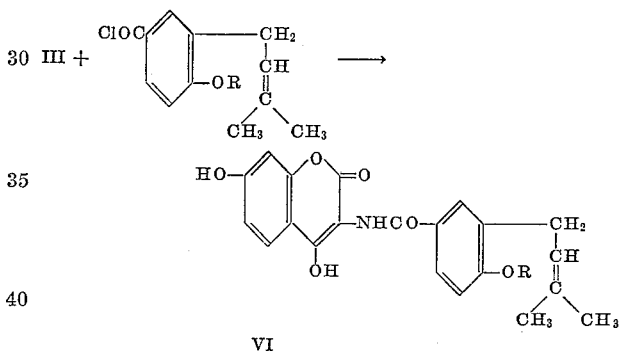

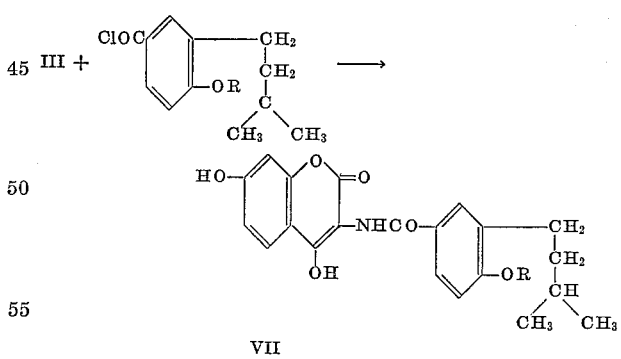

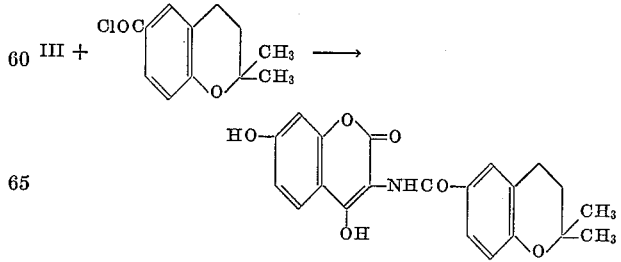

wherein R respresents an acyl group.

These reactions are conveniently carried out by suspending the coumarin compound in water adding sodium acetate thereto, and then adding the acyl chloride in small amounts while agitating the reaction mixture. After completion of the reaction, the desired product is obtained by acidifying the aqueous solution to a pH of about 2. At this pH the product is insoluble and can be recovered by filtration. If desired, the product can be further purified by crystallization from suitable solvents.

In accordance with another embodiment of this invention, it is now discovered that 3-amino-4,7-dihydroxy-coumarin hydrochloride (III) can be prepared starting with 4,7-dihydroxycoumarin. Thus, 4,7-dihydroxy-coumarin (I) is treated with nitrous acid to produce 2,4-dioxo-7-hydroxy-3-oximinochroman (II), and this product is reduced with hydrogen in the presence of a noble metal catalyst, such as palladium on charcoal, to produce the desired 3-amino-4,7-dihydroxy-coumarin hydrochloride (III). These reactions can be shown structurally as follows:

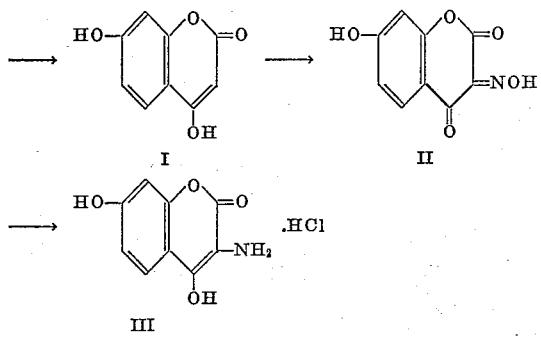

The step of converting the 4,7-dihydroxycoumarin to 2,4-dioxo-7-hydroxy-3-oximinochroman (II) is readily carried out by suspending the starting material in water, and adding a solution of sodium nitrite. To insure completion of the reaction, the mixture is shaken frequently for 3 hours during which time the coumarin compound gradually dissolves. After all the coumarin compound is dissolved, the reaction mixture is acidified with acetic acid and cooled causing the oximino compound to precipitate in crystalline form and it can be readily recovered by filtration.

The final step in the process of preparing 3-amino-4,7-dihydroxycoumarin hydrochloride is conveniently carried out by dissolving the 2,4-dioxo-7-hydroxy-3-oximinochroman in a suitable solvent such as ethanol, adding a noble metal catalyst, and at least one equivalent of hydrochloric acid, and hydrogenating the resulting reaction mixture. The hydrogenation is continued until the required amount of hydrogen has been absorbed. In carrying out this reduction, it is preferred to use a palladium catalyst suspended on charcoal, although other forms of noble metals or suspended noble metals on inert carriers can be used for this purpose. When the reaction is carried out in this manner the product is readily recovered by filtering off the catalyst and evaporating the resulting solution to dryness.

The 3-($\gamma,\gamma$-dimethylallyl)-4-acyloxybenzoyl chloride used as a starting material in the above-described process can be prepared by acylating 3-($\gamma,\gamma$-dimethylallyl)-4-hydroxybenzoic acid and treating the sodium salt of the acylated product with oxalyl chloride.

In carrying out the acylation of 3-($\gamma,\gamma$-dimethylallyl)-4-hydroxybenzoic acid any of the several methods for effecting the acylation of phenolic compounds can be used. It is found that the acyl derivatives of lower aliphatic carboxylic acids having from 2-8 carbon atoms are particularly advantageous in the described process and are therefore preferred intermediate products. Such acylated derivatives are readily prepared by reaction with the acid anhydride in the presence of pyridine. For example, the acetoxy derivative is conveniently obtained by mixing the hydroxybenzoic acid with acetic anhydride in the presence of dry pyridine and allowing the resulting reaction mixture to stand overnight. The acetylated product can be recovered by conventional means such as treating the reaction mixture with water, acidifying the resulting solution and recovering the precipitated product by filtration.

The second step in the process of preparing 3-($\gamma,\gamma$-dimethylallyl)-4-acetoxybenzoyl chloride is readily accomplished by treating the sodium salt of the acylated product with oxalyl chloride at lower temperatures in a suitable solvent medium such as benzene. After completion of the reaction the precipitated sodium chloride is removed and the filtrate concentrated at reduced pressure to obtain the acid chloride.

The 3-(3-[3-methylbutyl]-4-acyloxybenzoyl chloride is obtained in a manner similar to that described above for the preparation of 3-($\gamma,\gamma$-dimethylallyl)-4-acyloxybenzoyl chloride using 3-(3-methylbutyl)-4-hydroxybenzoic acid as the starting material. Thus, the starting material is first acylated to form the corresponding acylated derivative and this acylated derivative is reacted with thionyl chloride to produce 3-(3-methylbutyl)-4-acyloxybenzoyl chloride.

The 2,2-dimethylchroman-6-carbonyl chloride utilized in the foregoing described process can be readily prepared by reacting 2,2-dimethylchroman-6-carboxylate with thionyl chloride at room temperature. After completion of the reaction, the mixture is concentrated under reduced pressure to obtain the desired product in solid form.

The 3-acylamino-4,7-dihydroxycoumarin which is used as a starting material in the foregoing described reactions is readily prepared by reacting 3-amino-4,7-dihydroxycoumarin with an acylating agent to produce the diacylated product which on selective hydrolysis is converted to the 3-acylamino-4,7-dihydroxycoumarin (V). These reactions can be shown as follows:

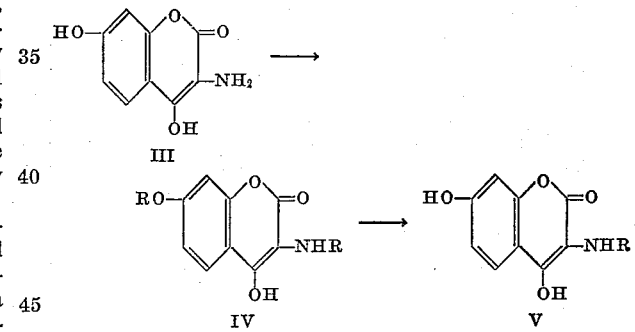

wherein R represents an acyl group.

In thus preparing Compound V, it is preferred to utilize lower aliphatic acid esters for this purpose. Thus, the diacylated derivative is conveniently obtained by reacting the starting material in the presence of pyridine with an anhydride of a lower aliphatic acid having from 2-8 carbon atoms. The diacylated derivative so obtained is selectively hydrolyzed by reaction with a solution of an alkali such as sodium hydroxide.

In the reactions described above, 3-amino-4,7-dihydroxycoumarin and its N-acylated derivatives have been described and written structurally as coumarin compounds. However, these compounds may exist and react as chromone compounds in which the positions of the 4-hydroxy group and the keto group are reversed. Thus, these compounds may be shown structurally as follows:

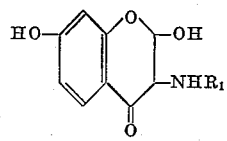

wherein $R_1$ represents hydrogen or an acyl group.

The novel novobiocin-like compounds of the present invention, namely, 8-desmethylnovobiocin, 8-desmethyldihydronovobiocin, 8-desmethylcyclonovobiocin and 7-(3-carbamyl-4-methylnovobiosyloxy)-3-acetamino-4-hydroxycoumarin, are useful antimicrobial agents. For example, they can be utilized to remove susceptible microorganisms from pharmaceutical equipment and the like, or to separate certain microorganisms from solutions containing mixtures of several microorganisms. In addition, these new novobiocin-like compounds are also effective in the treatment and control of plant diseases.

The following examples are presented as illustrative embodiments of the present invention.

EXAMPLE 1

*Preparation of 8-Desmethylnovobiocin (X)*

A solution of 2.1 g. of 4,7-dihydroxy-3-(3'-[γ,γ-dimethylallyl]-4'-acetoxybenzoylamino)-coumarin (VI) in 50 ml. of purified anhydrous dioxane is stirred while about 4 g. of anhydrous calcium sulfate and 4.6 g. of silver oxide are added. The mixture is protected from light and stirred for one hour. A small amount of iodine is added followed by a solution of 2.9 g. of 2-acetyl-3-carbamyl-4-methylnovobiosylchloride in 10 ml. of pure anhydrous dioxane. The reaction mixture is stirred for 5–10 hours. The mixture is filtered to remove insoluble byproducts and following reduction of the excess iodine with sodium bisulfite, the filtrate is concentrated under reduced pressure. The residue is hydrolyzed with dilute sodium hydroxide solution at room temperature. The sodium hydroxide is added until the pH of the solution becomes constant at about 7. The solution is lyophilized and the residue is leached with warm methanol which dissolves the mono sodium salt of 8-desmethylnovobiocin. The sodium salt can be crystallized by adding benzene or the free acid can be precipitated by adding acetic acid followed by water.

EXAMPLE 2

*Preparation of 8-Desmethyldihydronovobiocin (XI)*

A solution of 2.1 g. of 3-(3-[3-methylbutyl]-4-acetoxybenzoylamino)-4,7-dihydroxycoumarin (VII) in 50 ml. of purified anhydrous dioxane is stirred while about 4 g. of anhydrous calcium sulfate and 4.6 g. of silver oxide are added. The mixture is protected from light and stirred for one hour. A small amount of iodine is added followed by a solution of 2.9 g. of 2-acetyl-3-carbamyl-4-methylnovobiosyl chloride in 10 ml. of pure anhydrous dioxane. The reaction mixture is stirred for 5–10 hours. The product is isolated in the same manner as described above in Example No. 1.

EXAMPLE 3

*Preparation of 8-Desmethylcyclonovobiocin (XII)*

A solution of 2.1 g. of 4,7-dihydroxy-3-(2,2-dimethylchroman-6-carboxamido)-coumarin (VIII) in 50 ml. of purified anhydrous dioxane is stirred while about 4 g. of anhydrous calcium sulfate and 4.6 g. of silver oxide are added. The mixture is protected from light and stirred for one hour. A small amount of iodine is added followed by a solution of 2.9 g. of 2-acetyl-3-carbamyl-4-methylnovobiosyl chloride in 10 ml. of pure anhydrous dioxane. The reaction mixture is stirred for 5–10 hours. The product is isolated in the same manner as described above in Example No. 1.

EXAMPLE 4

*Preparation of 7-(3-Carbamyl-4-Methylnovobiosyloxy)-3-Acetamino-4-Hydroxycoumarin*

A solution of 1.2 g. of 3-acetamino-4,7-dihydroxycoumarin (V) in 50 ml. of purified anhydrous dioxane is stirred while 4 g. of anhydrous calcium sulfate and 4.6 g. of silver oxide are added. The mixture is protected from light and stirred for one hour. A small amount of iodine is added followed by a solution of 2.9 g. of 2-acetyl-3-carbamyl-4-methylnovobiosyl chloride in 10 ml. of pure anhydrous dioxane. The reaction mixture is stirred for 5–10 hours. The product is isolated in the same manner as described above in Example No. 1.

EXAMPLE 5

*Preparation of 3-Carbamyl-4-Methylnovobiose*

To a solution of 20 g. of novobiocin in one liter of methyl alcohol is added 10 ml. of hydrochloric acid (sp. gr. 1.19). The resulting solution is refluxed for about 1¼ hours, after which it is diluted with an equal volume of water and cooled. The resulting precipitate is collected and the filtrate is concentrated to about 300 ml. under reduced pressure. After filtering the concentrated solution it is made alkaline with sodium bicarbonate and lyophilized.

The residual solids are extracted portionwise with about 300 ml. of acetone and the combined acetone extracts are concentrated to about 25 ml. Methyl 3-carbamyl-4-methylnovobioside crystallizes from the resulting solution, and is collected and washed with acetone. After recrystallization from hot acetone the product is found to melt at 190–192° C.

One and one-half grams of methyl 3-carbamyl-4-methyl-novobioside is heated on the steam bath in 150 ml. of 0.1 N hydrochloric acid about forty-five minutes until the rotation of the solution reaches a constant value. The observed rotation of the solution at the end of this time is +0.50° in a 1 cm. tube (D line of sodium used). The resulting solution is lyophilized to produce 3-carbamyl-4-methylnovobiose as a glass $[\alpha]_D^{22} = +46°$ (c., 1 in methanol).

EXAMPLE 6

*Preparation of 2-Acetyl-3-Carbamyl-4-Methylnovobiosyl Chloride From 3-Carbamyl-4-Methylnovobiose*

A. *Preparation of 1,2-diacetyl-3-carbamyl-4-methyl-novobiose.*—A 2.35 g. (0.01 mole) portion of 3-carbamyl-4-methyl-novobiose is added to 15 ml. of acetic anhydride and 12 g. of sodium acetate and the mixture is warmed at 100° C. for about an hour. The cooled reaction mixture is diluted with 30 ml. of ice and water and neutralized with sodium bicarbonate. The product is extracted into chloroform which is washed with water and dried. Removal of the chloroform gives 1,2-diacetyl-3-carbamyl-4-methylnovobiose (XI).

B. *Preparation of 2-acetyl-3-carbamyl-4-methylnovobiosyl chloride.*—A solution of 1.6 g. (0.005 mole) of 1,2-diacetyl-3-carbamyl-4-methylnovobiose in 40 ml. of anhydrous ether is saturated (at about 0° C.) with anhydrous hydrogen chloride. The reaction mixture is kept at ice temperature for an extended period of time. The ether and excess hydrogen chloride are removed at reduced pressure. The last traces are removed by dissolving the residue in benzene and removing it at reduced pressure to yield 2-acetyl-3-carbamyl-4-methylnovobiosyl chloride.

EXAMPLE 7

*Preparation of 4,7-Dihydroxy-3-(3'-[γ,γ-Dimethylallyl]-4'-Acetoxybenzoylamino)-Coumarin (VI)*

A suspension of 11.5 g. of 3-amino-4,7-dihydroxycoumarin hydrochloride (III) in 100 ml. of water containing 16 g. of sodium acetate is treated portionwise with 13.4 g. of 3-(γ,γ-dimethylallyl)-4-acetoxybenzoyl chloride with shaking. The mixture is shaken for about one hour after the final addition of acid chloride. The mixture is acidified to about pH 2 with hydrochloric acid. The product is removed and recrystallized.

EXAMPLE 8

*Preparation of 3-(3-[3-Methylbutyl]-4-Acetoxybenzoylamino)-4,7-Dihydroxycoumarin (VII)*

A suspension of 11.5 g. of 3-amino-4,7-dihydroxycoumarin hydrochloride (III) in 100 ml. of water containing 16 g. of sodium acetate is treated with 13.4 g. of 3-(3-methylbutyl)-4-acetoxybenzoyl chloride with shaking. The mixture is shaken for about one hour after the final addition of acid chloride. The mixture is acidified to about pH 2 with hydrochloric acid. The product is removed and recrystallized.

EXAMPLE 9

*Preparation of 4,7-Dihydroxy-3-(2,2-Dimethylchroman-6-Carboxamido)-Coumarin (VIII)*

A suspension of 11.5 g. of 3-amino-4,7-dihydroxycoumarin hydrochloride (III) in 100 ml. of water containing 16 g. of sodium acetate is treated portionwise with 11.2 g. of 2,2-dimethylchroman-6-carbonyl chloride with shaking. The mixture is shaken for about one hour after the final addition of acid chloride. The mixture is acidified to about pH 2 with hydrochloric acid. The product is removed and recrystallized.

EXAMPLE 10

*Preparation of 3-Acetamino-4,7-Dihydroxycoumarin*

A solution of 115 mg. of 3-amino-4,7-dihydroxycoumarin hydrochloride (III) in 4 ml. of pyridine is cooled in an ice-bath and 0.3 ml. of acetic anhydride is added. The solution is allowed to warm to room temperature and is kept overnight. The mixture (containing some crystalline material) is poured into 20 ml. of ice and water, acidified to pH 2 with concentrated hydrochloric acid and extracted with four 25 ml. portions of chloroform. The combined chloroform extracts are dried over magnesium sulfate and evaporated to dryness under reduced pressure. The solid 3-acetamino-7-acetoxy-4-hydroxycoumarin is crystallized from ethyl acetate.

One gram of 3-acetamino-7-acetoxy-4-hydroxycoumarin (IV) is dissolved in 10 ml. of 10% sodium hydroxide solution and kept at room temperature for about twenty minutes. The solution is then cooled and acidified to pH 2 with concentrated hydrochloric acid. The solid product is collected on a filter, washed with a small amount of cold water and dried.

EXAMPLE 11

*Preparation of 3-Amino-4,7-Dihydroxycoumarin Hydrochloride*

To a suspension of 0.50 g. of 4,7-dihydroxycoumarin [Sonn, Ber., 50, 1299 (1917)], in 200 ml. of water is added a solution of 0.20 g. of sodium nitrite in 5 ml. of water. The mixture is kept at room temperature and shaken frequently. After all the dihydroxycoumarin has dissolved the solution is acidified with acetic acid. The oximino compound 2,4-dioxo-7-hydroxy-3-oximinochroman (II), separates in small yellow plates and after thorough cooling is collected on a filter, washed with a small amount of cold water and dried.

A solution of 97 mg. of 2,4-dioxo-7-hydroxy-3-oximinochroman (II) in 20 ml. of absolute ethanol is added to a suspension of 500 mg. of prereduced palladium on activated charcoal (10%) in 20 ml. of absolute ethanol containing 0.58 ml. of 2.5 N hydrochloric acid. The mixture is shaken with hydrogen at room temperature and atmospheric pressure until two molar equivalents of hydrogen have been absorbed and the reaction stops. The catalyst is removed by filtration and washed with a little ethanol. The filtrate and washings are evaporated to dryness under reduced pressure in a nitrogen atmosphere. The product is crystallized from alcohol.

EXAMPLE 12

*Preparation of 3-(γ,γ-Dimethylallyl)-4-Hydroxybenzoic Acid Starting With Ethyl-p-Hydroxybenzoate*

A. *Preparation of ethyl 3-(γ,γ-dimethylallyl)-4-hydroxybenzoate.*—A mixture of 7 g. of sodium metal cut into small pieces, 300 ml. of dry toluene, and 50 g. of ethyl p-hydroxybenzoate is heated under reflux and stirred for a few hours. The mixture is cooled in an ice bath and stirred while 50 g. of γ,γ-dimethylallyl bromide is added dropwise during a period of two hours. The reaction mixture is stirred for fifteen hours at room temperature and then warmed to 50° C. for one-half hour. After filtration to remove sodium bromide, the toluene solution is concentrated under reduced pressure to 100 ml. and extracted three times with 100 ml. portions of 2.5 N sodium hydroxide. The alkaline extracts are combined, cooled to 0° C. and carefully acidified to pH 6 with 2 N sulfuric acid. The heavy oil which separates is extracted with ether, dried over magnesium sulfate and concentrated in vacuo; weight 42 g. This oil is dissolved in cyclohexane and extracted with a saturated solution of sodium carbonate to remove some unreacted ethyl p-hydroxybenzoate. The cyclohexane layer is dried over magnesium sulfate and concentrated in vacuo. The residue is dissolved in a boiling mixture of equal parts of cyclohexane and petroleum ether (B.P. 30–60°). After cooling at room temperature for a few hours and 3° overnight, the colorless prisms are collected on a filter; M.P. 62–66°. Recrystallization from a mixture of cyclohexane and petroleum ether (B.P. 30–60° C.) gives 18.9 g. of colorless prisms; M.P. 66–69° C.

B. *Preparation of 3-(γ,γ-dimethylallyl)-4-hydroxybenzoic acid.*—A solution of 7 g. of ethyl 3-(γ,γ-dimethylallyl)-4-hydroxybenzoate in 30 ml. of 4 N sodium hydroxide is heated on the steam cone for four hours. After cooling in an ice bath, the resulting solution of the sodium salt of 3-(γ,γ-dimethylallyl)-4-hydroxybenzoic acid is acidified with dilute hydrochloric acid and extracted with ether. The combined ether extracts are washed with water, dried over magnesium sulfate, filtered, and concentrated in vacuo. The residue is dissolved in hot benzene and crystallized by slowly adding cyclohexane; M.P. 80–84°. Recrystallization from a mixture of benzene and cyclohexane gives colorless prisms; M.P. 87–89°. Several recrystallizations from benzene give prisms melting at 94–95° C. The 3-(γ,γ-dimethylallyl)-4-hydroxybenzoic acid can be purified by dissolving it in a solution of sodium carbonate and extracting with ether. After acidifying the ice cold sodium carbonate solution with hydrochloric acid, the product is collected on a filter and washed with cold water. Recrystallization from a mixture of methanol and water gives colorless needles; M.P. 101–103° C.

EXAMPLE 13

*Preparation of 3-(γ,γ-Dimethylallyl)-4-Acetoxybenzoyl Chloride From 3-(γ,γ-Dimethylallyl)-4-Acetoxybenzoic Acid*

A. *Preparation of 3-(γ,γ-dimethylallyl)-4-acetoxybenzoic acid.*—A solution of 20.6 g. (0.1 mole) of 3-(γ,γ-dimethylallyl)-4-hydroxybenzoic acid (VI) in 100 ml. of dry pyridine is treated with 12.8 g. (0.125 mole) of acetic anhydride and kept at room temperature overnight. The reaction mixture is diluted with 400 ml. of ice and water and acidified with concentrated hydrochloric acid. The precipitated product is removed by filtration. The crude product is recrystallized from petroleum ether (B.P. 85–100°) to yield purified 3-(γ,γ-dimethylallyl)-4-acetoxybenzoic acid.

B. *Preparation of 3-(γ,γ-dimethylallyl)-4-acetoxybenzoyl chloride.*—A suspension of 24.8 g. (0.1 mole) of 3-(γ,γ-dimethylallyl)-4-acetoxybenzoic acid in 50 ml. of water is treated with 40 ml. of 2.5 N sodium hydroxide. The resultant solution is lyophilized to yield a residue of sodium 3-(γ,γ-dimethylallyl)-4-acetoxybenzoate. The sodium salt is added portionwise with stirring at ice temperature to a solution of 127 g. (1 mole) of oxalyl chloride in 400 ml. of dry benzene. After the final addition, stirring is continued for about 2 hours. The precipitated sodium chloride is removed and the filtrate is concentrated at reduced pressure. The residue is redissolved in benzene and reconcentrated to remove last traces of oxalyl chloride from the 3-(γ,γ-dimethylallyl)-4-acetoxybenzoyl chloride.

EXAMPLE 14

*Preparation of 3-(3-Methylbutyl)-4-Hydroxybenzoic Acid*

A solution of 3 g. of ethyl 3-(γ,γ-dimethylallyl)-4-hydroxybenzoate in 50 ml. of ethanol was hydrogenated over 0.5 g. of platinum oxide catalyst. The theoretical amount of hydrogen was taken up within one hour. After removal of the catalyst by filtration, the alcohol was distilled under reduced pressure. The ethyl 3-(3-methylbutyl)-4-hydroxybenzoate was dissolved in 20 ml. of 4 N sodium hydroxide and heated on the steam cone for four hours. After acidification with hydrochloric acid, the mixture was extracted with ether. The ether extract was dried over magnesium sulfate, filtered, and concentrated in vacuo. The residue was dissolved in hot benzene and cyclohexane was added. After cooling the 3-(3-methylbutyl)-4-hydroxybenzoic acid was collected on a filter. Recrystallization from a mixture of chloroform and cyclohexane gave colorless needles; M.P. 108–9° C.

*Analysis.*—Calcd. for $C_{12}H_{16}O_3$: C, 69.20; H, 7.75. Found: C, 68.98; H, 7.29.

EXAMPLE 15

*Preparation of 3-(3-Methylbutyl)-4-Acetoxybenzoyl Chloride*

A mixture of 10.4 g. (0.005 mole) of 3-(3-methylbutyl)-4-hydroxybenzoic acid and 50 ml. of pyridine is treated with 10 ml. of acetic anhydride. The mixture is kept at room temperature overnight. The mixture is poured into 300 ml. of ice and water. The resultant mixture is acidified to about pH 2 with concentrated hydrochloric acid. The precipitated product is removed and purified by recrystallization from petroleum ether (B.P. 85–100°).

A mixture of 13 g. (0.05 mole) of 3-(3-methylbutyl)-4-acetoxybenzoic acid and 50 ml. of thionyl chloride is kept at room temperature overnight. The solution is concentrated at reduced pressure. The residue is dissolved in 50 ml. of dry benzene and reconcentrated at reduced pressure to yield a residue of the desired acid chloride.

EXAMPLE 16

*Preparation of 2,2-Dimethylchroman-6-Carbonyl Chloride*

A mixture of 10.3 g. (0.05 mole) of 2,2-dimethylchroman-6-carboxylate and 50 ml. of thionyl chloride is kept at room temperature overnight. The mixture is concentrated at reduced pressure. The residue is redissolved in 50 ml. of dry benzene and reconcentrated to yield a residue of the desired acid chloride.

Various changes and modifications of the invention can be made, and, to the extent that such variations incorporate the spirit of this invention, they are intended to be included within the scope of the appended claims.

What is claimed is:

1. A process which comprises reacting 4,7-dihydroxycoumarin with nitrous acid to produce 2,4-dioxo-7-hydroxy-3-oximinochroman, and reducing this compound by reaction with hydrogen in the presence of a noble metal catalyst and hydrochloric acid to produce 3-amino-4,7-dihydroxycoumarin hydrochloride.

2. The process of claim 1 in which the noble metal catalyst is palladium on charcoal.

References Cited in the file of this patent

UNITED STATES PATENTS 2,929,821     Hoeksema et al.  _____ Mar. 22, 1960

OTHER REFERENCES

Hoeksema et al.: Jour. Amer. Chem. Soc., vol. 77, pages 6710–11 (1955).

Kaczka et al.: Jour. Amer. Chem. Soc., vol. 77, pages 6404–5 (1955).

Hinman et al.: Jour. Amer. Chem. Soc., vol. 78, pages 1072–4 (March 5, 1956).